United States Patent [19]

Abarotin et al.

[11] 3,859,709

[45] Jan. 14, 1975

[54] APPARATUS FOR EXPANDING AND APPLYING A JACKET TO A SPLICED SECTION OF AN ELECTRICAL CABLE

[75] Inventors: Eugene V. Abarotin, Murrysville Borough; Robert A. Wilshire, Jr., Monroeville Borough, both of Pa.

[73] Assignee: United States Steel Corporation, Pittsburgh, Pa.

[22] Filed: Jan. 23, 1974

[21] Appl. No.: 435,930

Related U.S. Application Data

[63] Continuation of Ser. No. 326,928, Jan. 26, 1973, abandoned.

[52] U.S. Cl. ............................... 29/203 D, 29/235
[51] Int. Cl. ...................... B23p 19/04, B23p 19/02
[58] Field of Search .......... 29/203 D, 203 C, 203 R, 29/235

[56] References Cited
UNITED STATES PATENTS 2,683,924  7/1954  Schryver ........................ 29/203 D
3,010,194  11/1961  Fratzke ............................. 29/235

*Primary Examiner*—Thomas H. Eager
*Attorney, Agent, or Firm*—Walter P. Wood

[57] ABSTRACT

Apparatus includes a pair of elongated symmetrical gripper bodies having jaws spaced therealong for receiving and clamping the peripherally projecting fins of a resilient tubular jacket and a two-part support for the gripper bodies with means incorporated therewith for moving one gripper body laterally away and toward the other while the gripper body jaws are clamped onto the fins of a jacket so as to expand said jacket to receive the spliced section of an electrical cable when the gripper bodies are moved away from each other and to contract the jacket around the spliced section of the electric cable when the gripper bodies are moved toward each other.

8 Claims, 5 Drawing Figures

PATENTED JAN 14 1975            3,859,709

APPARATUS FOR EXPANDING AND APPLYING A JACKET TO A SPLICED SECTION OF AN ELECTRICAL CABLE

This is a continuation, of application Ser. No. 326,928, filed Jan. 26, 1973, now abandoned.

The present invention relates generally to electrical cable amd more particularly to apparatus for expanding and applying a resilient jacket to a spliced section of an electrical cable which is especially suitable for use in putting a jacket over a spliced section of a trailing cable.

Splicing of an electrical trailing cable consists of joining the conductors of the cable, insulating the joined conductors, and applying a jacket around the insulated conductors for protection against abrasion and moisture.

There are various types of jackets available on the market for the purpose of protecting spliced sections of electrical cable. These various types of jackets are applied in various ways. Some are shrunk on the insulated conductors by applying heat in some form; others are slipped over the insulated conductors and held in place with rubber cement. Another type is mechanically shrunk on the cable by removing an internal support that formerly retained the jacket in an expanded state. Yet another type is transversely stretched just prior to its application and contracted or shrunk around the cable. The present invention relates to apparatus for expanding and applying the latter type of jacket.

Prior to our invention, the use of the latter type of jacket was somewhat restricted due to the difficulty encountered in expanding and applying the jacket to the joined and insulated conductors. This created a particularly disadvantageous situation since this type of jacket could be made very economically of rubber, polypropylene or similar material and sold on the market at a reasonable price.

Accordingly, it is the primary object of our invention to provide apparatus for expanding and applying a jacket to a spliced section of electrical cable which functions to apply a jacket around an electrical cable more quickly and easier than was possible heretofore.

It is a more specific object of our invention to provide apparatus as set forth by the above object which includes a pair of elongated symmetrical gripper bodies having jaws spaced therealong for receiving and clamping the peripherally projecting fins of a resilient tubular jacket and a two-part support for the gripper bodies with means incorporated therewith for moving one gripper body laterally away and toward the other while the gripper body jaws are clamped onto the fins of a jacket so as to expand said jacket to receive the spliced section of an electrical cable when the gripper bodies are moved away from each other and to contract the jacket around the spliced section of the electrical cable when the gripper bodies are moved toward each other.

These and other objects will become more apparent after referring to the following specification and drawing, in which.

Figure 1:
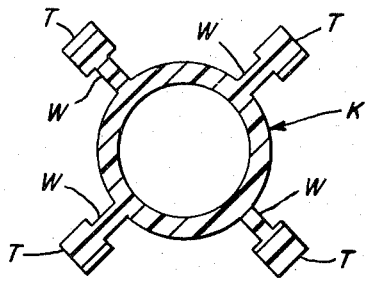
FIG. 1 is a sectional view of a conventional cable jacket intended to be expanded and applied by the apparatus of the invention.

Referring more particularly to the drawing, reference character 2 designates generally the base of the invention and reference character 4 designates generally the clamping bodies of the invention.

The base 2 includes a pair of elongated tubular frames 6 and 8 that are connected to each other by means of guide rods 10 which extend transversely through the tubular members 6 and 8 adjacent the ends thereof; and a hydraulic cylinder 12 having a piston rod 14 slidable therein with one end projecting from the cylinder. The rods 10 are rigidly affixed to the tubular frame 6 and pass through linear tubes 16 which are in turn fixed to tubular frame 8 by means of elongated tubes 18 (see FIGS. 2 and 3).

Figure 2:
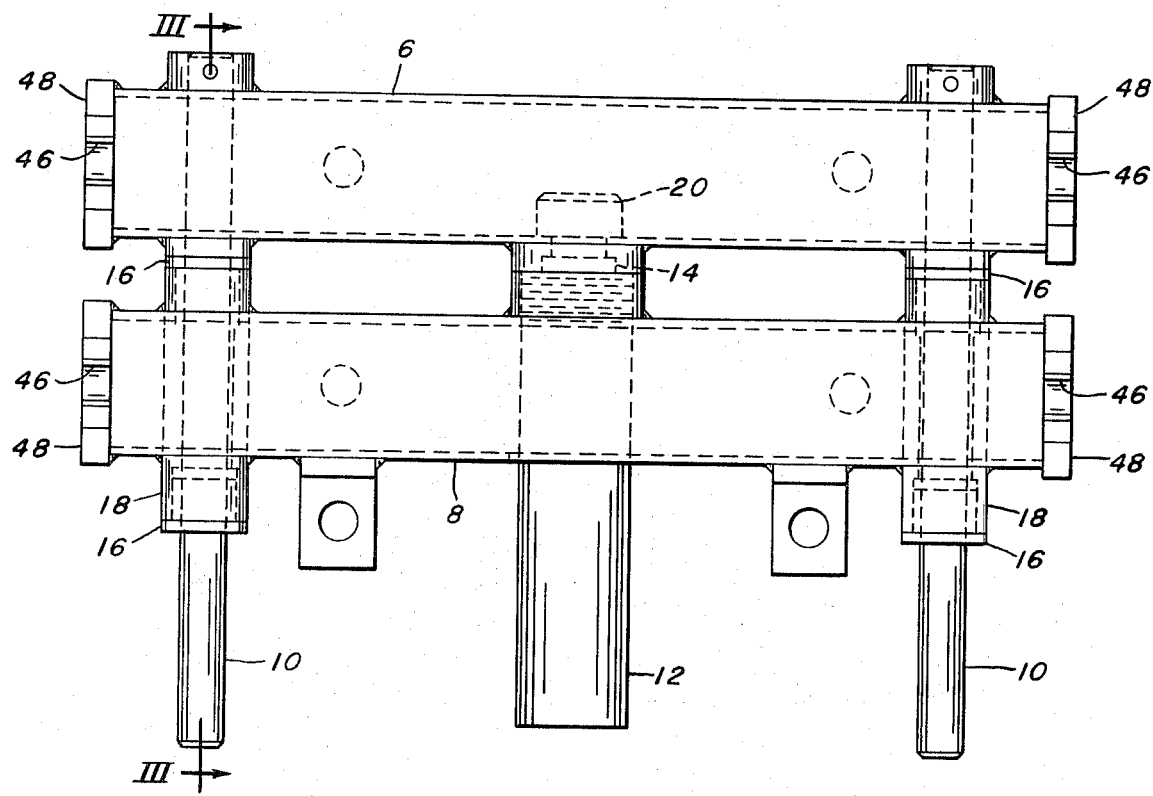
FIG. 2 is a plan view of the support element of the invention.
Figure 3:
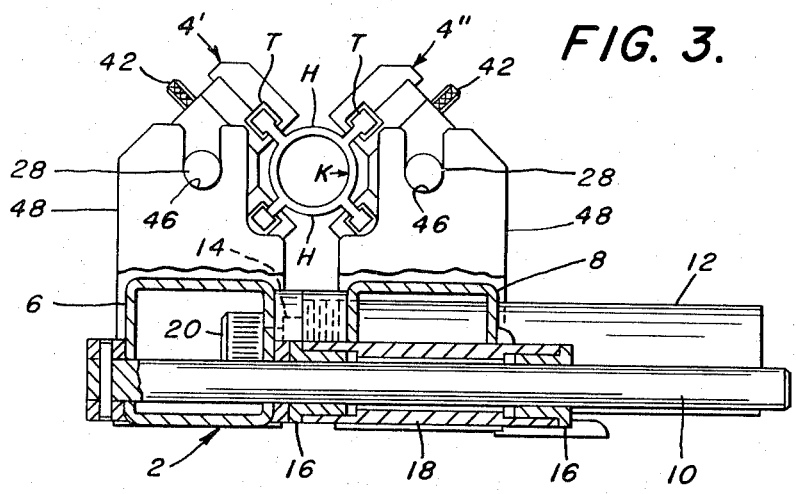
FIG. 3 is a sectional view taken substantially along the line III—III of FIG. 2.
Figure 4:
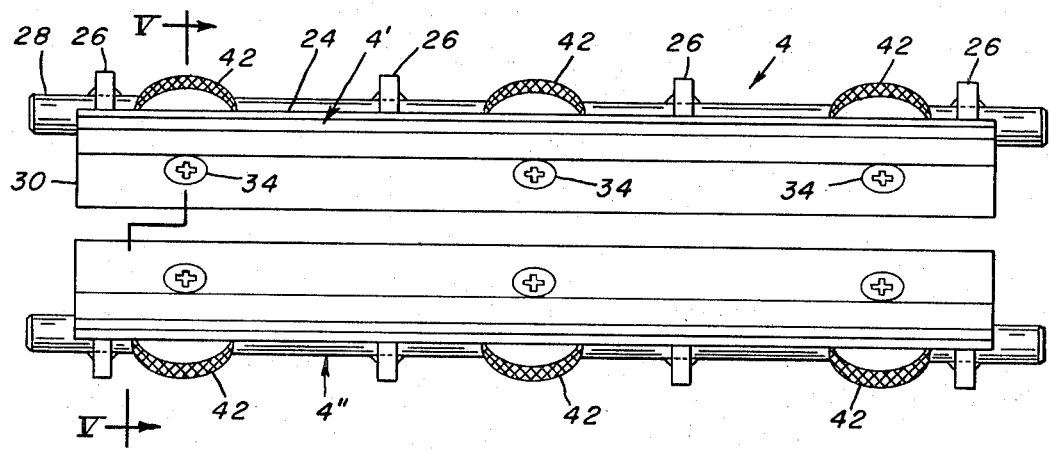
FIG. 4 is a plan view of the gripper body assembly of the invention.

The projecting end of the piston rod 14 is fixedly attached to tubular frame member 6 by means of a cap screw 20 while the cylinder 12 is screwed into the wall of tubular frame member 8, as best shown in FIG. 2. When the piston rod 14 is projected from the cylinder 12, it separates the tubular frame members 6 and 8 laterally in a planar motion by sliding tubular frame member 8 on the rods 10.

The gripper body assembly 4 consists of two symmetrical halves 4' and 4''. Since both halves 4' and 4'' are identical in structure, only gripper body assembly half 4' will be described in detail.

Gripper body assembly half 4' is made up of an elongated lower fixed clamping jaw 22 and an elongated upper fixed clamping jaw 24 rigidly connected with each other by means of a gusset plate 26 and a retaining rod 28 which passes through and is welded to the gusset plate 26. Retaining rod 28 extends beyond both ends of the jaws 22 and 24.

Figure 5:
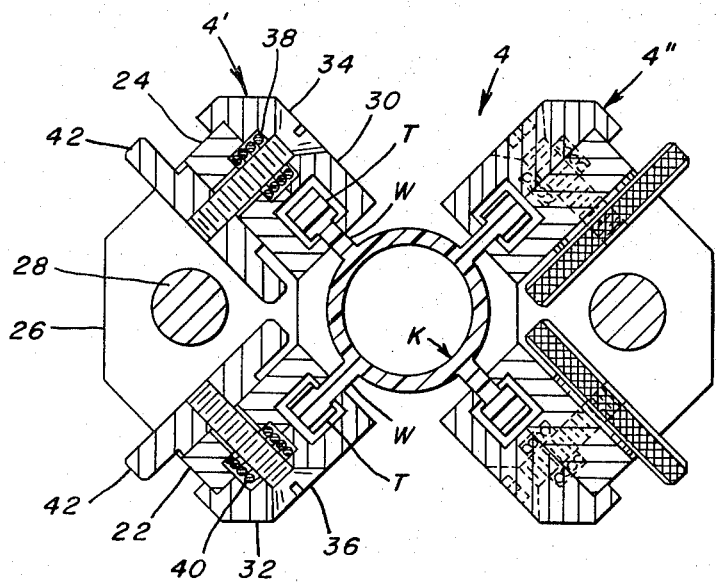
FIG. 5 is a sectional view taken substantially along the line V—V of FIG. 4.

An upper movable clamping jaw 30 and a lower movable clamping jaw 32 are attached to upper fixed clamping jaw 24 and lower fixed clamping jaw 22, respectively, by means of screws 34 and 36, respectively, and kept separated by means of springs 38 and 40, respectively. Gaps between each pair of fixed and movable clamping jaws are preadjusted by means of thumb wheels 42 to allow easy insertion of the webs W of the substantially T-shape peripheral fins T of the jacket K into these gaps. The thumb wheels 42 are threaded through their centers for engagement with screws 34 and 36 on the sides of the fixed clamping jaws 22 and 24 remote from the movable clamping jaws 30 and 32, respectively, (see FIG. 5). By clockwise rotation of the thumb wheels 42, the movable clamping jaws 30 and 32 are pulled closer to the fixed clamping jaws 24 and 22, respectively, thus decreasing the gaps between the fixed and movable jaws. By counterclockwise rotation of the thumb wheels, the gaps between the fixed amd movable jaws will be increased.

In operation, prior to the expansion of the jacket K, its four projections or fins T are inserted between the corresponding fixed and movable jaws and clamped in this position by rotating thumb wheels 42 in a clockwise direction. It will be noted that the jacket K is rotated so that its fins are offset from the normal planes passing through the center of the jacket K so that they will correspond to the offset positions of the clamping jaws of the gripper body assembly.

When all four fins T are locked in the jaws of the gripper body assembly, the gripper body assembly and the clamped jacket K are placed on the base 2 with the projecting ends of the retaining rod 28 resting in grooves 46 of cradle plates 48, one of which is upstanding adjacent each end of the tubular frame members 6 and 8. The cylinder 12 is then actuated to project piston rod 14 and cause tubular frame member 8 to move laterally away from member 6. This results in horizontal expansion of the jacket K.

The tension in the upper and lower arc portions H of the jacket K (see FIG. 3) pulls on the webs W of the upper and lower fins T, orienting them in the horizontal direction and increasing the horizontal distance between the webs of the upper fins and between the webs of the lower fins thus providing additional vertical clearance.

After the jacket K has thus been expanded, the spliced section of an electrical cable (not shown) is inserted into the jacket K and the cylinder 12 is actuated to retract the piston rod 14 and cause the tubular frame member 8 to move laterally toward member 6 and cause the jacket K to contract around the spliced section of the electrical cable (not shown).

While we have shown but one embodiment of our invention, other adaptations and modifications may be made without departing from the scope of the following claims.

We claim:

1. Apparatus for expanding and applying on a spliced section of electrical cable an elongated tubular resilient jacket having peripheral fins projecting therefrom spaced substantially ninety degrees apart and extending along the length of said jacket, said apparatus comprising a pair of elongated independent symmetrical gripper bodies adapted to be spaced opposite to and parallel with each other, each of said gripper bodies including pairs of gripper jaws extending along its length, the jaws of each pair of jaws being disposed substantially ninety degrees apart offset from the normal planes passing through the center of the space between said pair of gripper bodies when said gripper bodies are disposed opposite to and parallel with each other, means for selectively adjusting the distance between the jaws in each pair, said gripper bodies being adapted to be disposed on opposite sides of one of said jackets with the fins of said jacket received in and clamped by said pairs of jaws, and means removably attached to said gripper bodies when said jaws are in engagement with the fins of said jacket for relatively moving said gripper bodies laterally away from each other in a planar motion to thereby expand said jacket for receiving said spliced section of cable and toward each other to thereby contract said jacket on said spliced section of said cable.

2. Apparatus as defined by claim 1 in which a shaft extends longitudinally through and projects from each end of each of said gripper bodies, and said means for moving said gripper bodies from and toward each other comprises a pair of elongated tubular frames normally disposed in spaced parallel relation, a rod extending transversely through each of said tubular bodies adjacent the ends thereof, said rods being substantially parallel with each other, one of said tubular frames being rigidly fixed to said rods and the other of said tubular frames being slidably mounted on said rods, means connected with said tubular frames for moving said other of said tubular frames on said rods laterally from and to said one of said tubular frames, and a cradle plate upstanding adjacent each end of each of said tubular frames for supporting said gripper bodies by receiving and supporting the projecting ends of said shafts.

3. Apparatus as defined by claim 1 in which a shaft extends longitudinally through and projects from each end of each of said gripper bodies, and said means for moving said gripper bodies from and toward each other comprises a pair of elongated tubular frames normally disposed in spaced parallel relation, a rod extending transversely through each of said tubular bodies adjacent the ends thereof, said rods being substantially parallel with each other, one of said tubular frames being rigidly fixed to said rods and the other of said tubular frames being slidably mounted on said rods, a fluid pressure cylinder rigidly connected with said other of said tubular frames and extending transversely therethrough spaced between and parallel with said rods, a piston rod slidable in said cylinder with one end projecting therefrom, said projecting end of said piston rod being rigidly connected with said one of said tubular frames whereby movement of said piston rod relative to said cylinder moves said other of said tubular frames along said rods relative to said one of said tubular frames, and a cradle plate upstanding adjacent each end of each of said tubular frames for supporting said gripper bodies by receiving and supporting the projecting ends of said shafts.

4. Apparatus for applying an elongated resilient tubular jacket to a spliced section of an electrical cable, said jacket having circumferentially spaced external projections, said apparatus comprising a pair of opposed spaced-apart frame members, means connected to said frame members for moving them toward and away from each other, and gripper body assembly halves carried by the respective frame members, said gripper body assembly halves including jaws for clamping the apparatus to said projections at opposite sides of the jacket, whereby moving said frame members apart with the jacket clamped thereto expands the jacket enabling it to be applied to a cable.

5. An apparatus as defined in claim 4 comprising in addition a pair of guide rods fixed to one of said frame members, and a pair of tubes fixed to the other of said frame members slidably receiving said rods, and in which the means for moving said frame members includes motive means connected between the respective frame members.

6. An apparatus as defined in claim 4 in which said frame members include respective cradle plates, and said gripper body assembly halves include respective retaining rods removably received in said cradle plates.

7. An apparatus as defined in claim 4 in which each gripper body assembly half includes two jaws spaced approximately 90° apart.

8. An apparatus as defined in claim 4 in which said jaws are elongated for gripping said jacket along its full length.

* * * * *